Aug. 6, 1963   K. PENNING ETAL   3,100,265
STEREOSCOPIC MAP PLOTTING DEVICE FOR TRANSFORMING A PHYSICAL
THREE-DIMENSIONAL MOVEMENT INTO TWO
Filed Jan. 25, 1960   TWO-DIMENSIONAL MOVEMENTS
3 Sheets-Sheet 2
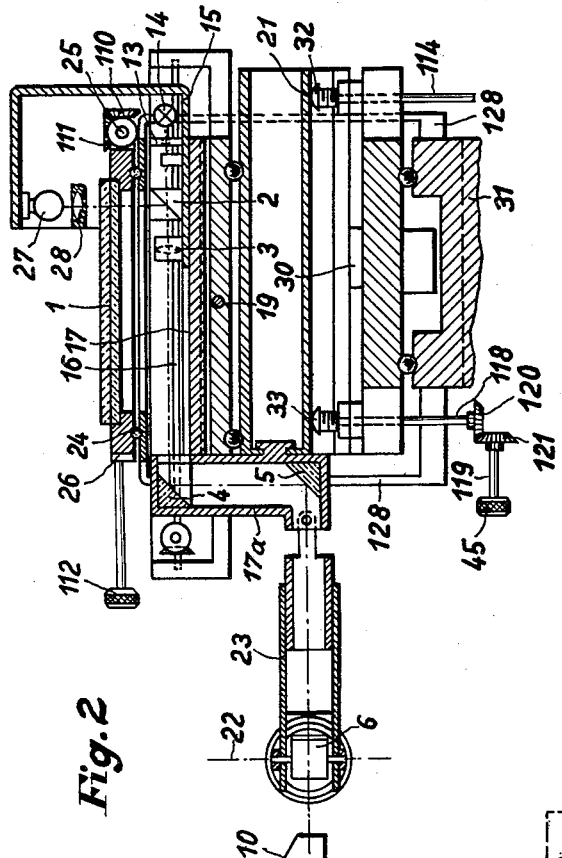
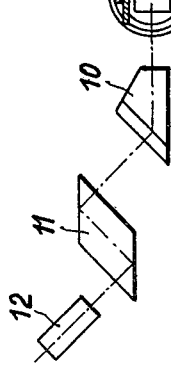
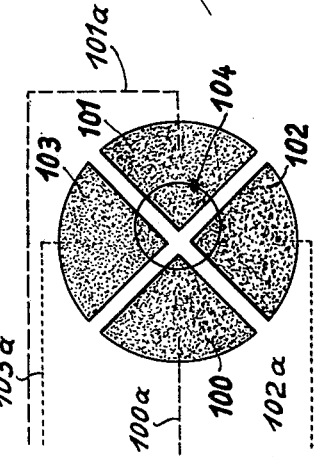
Inventors
KURT PENNING
MARTIN AHREND
By Toulmin & Toulmin
Attorneys Aug. 6, 1963 K. PENNING ETAL 3,100,265
STEREOSCOPIC MAP PLOTTING DEVICE FOR TRANSFORMING A PHYSICAL
THREE-DIMENSIONAL MOVEMENT INTO TWO
TWO-DIMENSIONAL MOVEMENTS
Filed Jan. 25, 1960 3 Sheets-Sheet 3

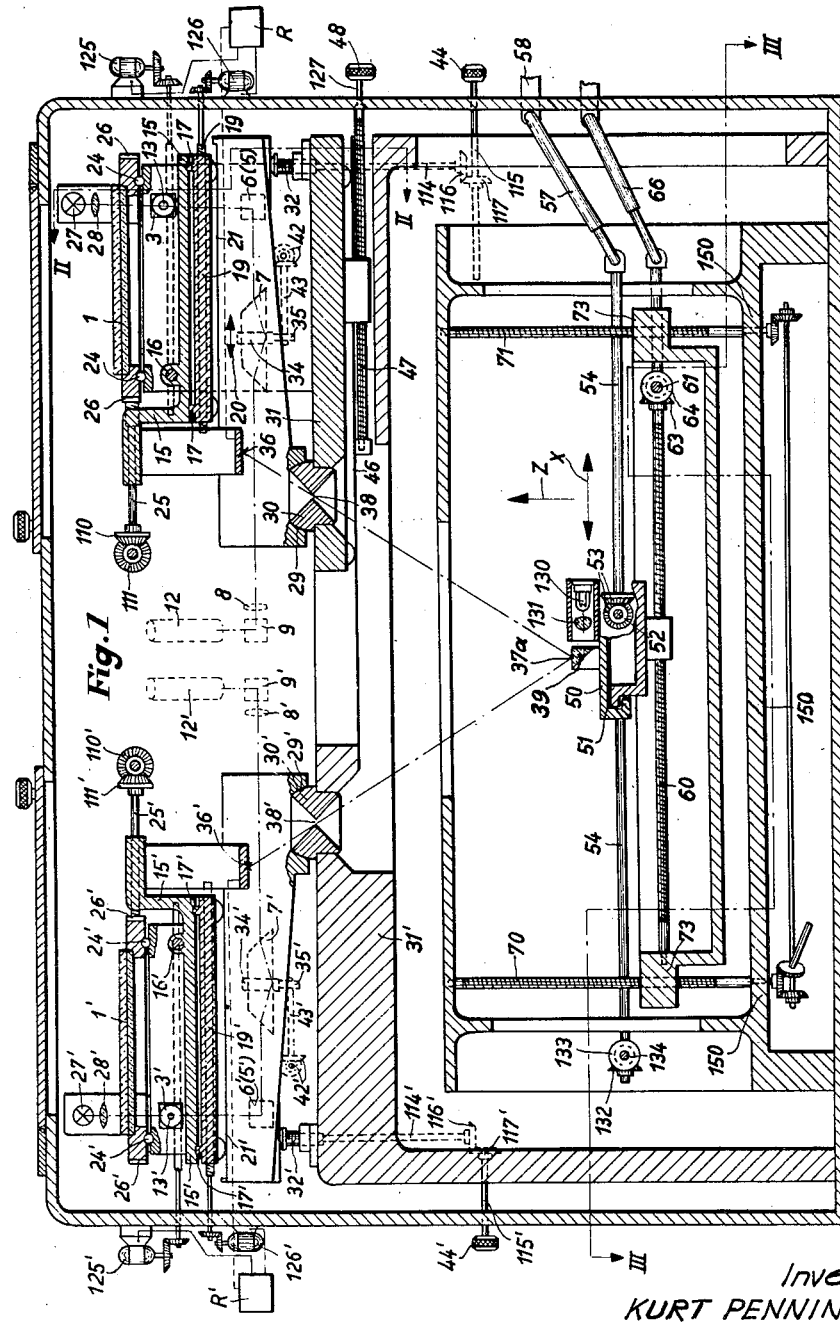

Inventors
KURT PENNING
MARTIN AHREND
By Toulmin & Toulmin
Attorneys

United States Patent Office 3,100,265
Patented Aug. 6, 1963

3,100,265
STEREOSCOPIC MAP PLOTTING DEVICE FOR TRANSFORMING A PHYSICAL THREE-DIMENSIONAL MOVEMENT INTO TWO TWO-DIMENSIONAL MOVEMENTS
Kurt Penning and Martin Ahrend, Aalen, Wurttemberg, Germany, assignors to Carl Zeiss, Optische Werke, Oberkochen, Wurttemberg, Germany
Filed Jan. 25, 1960, Ser. No. 4,281
Claims priority, application Germany Jan. 31, 1959
6 Claims. (Cl. 250—220)

The present invention relates to a photogrammetric stereoscopic map plotting apparatus and more in particular, to such map plotting apparatus having photoelectric follow-up control elements functioning as control members between the plotted point and the picture carriers, especially for evaluating aerial photographs.

Map plotting apparatus of the above referred-to type are described, for example, in the German Patent 968,042. These known apparatus are complicated in structure and particularly in operation. For producing the control light beams in the area of the plotted point two collimators have to be provided. The collimators are connected with the cross slide of the apparatus, and the light beams are directed towards photoelectric cells. Attention must be paid that the control light beams pass through the projection center of the respective photographic view, which calls for a constant readjustment of the collimators. The adjustment requires complicated means comprising, for example, a precision Cardan joint, which renders the apparatus complicated and constitutes a source of additional errors. Furthermore the known devices comprise two mirrors for adjusting the picture, e.g. an aerial photograph, which are rotatably positioned in the projection center of the respective photograph. The mirrors limit in a most undesirable manner the angular range of the projection system which can be evaluated.

With the foregoing in mind it is an object of the present invention to provide a photogrammetric stereoscopic map plotting apparatus, particularly for evaluating an aerial photograph of the type comprising photoelectric follow-up elements functioning as control members between the plotted point and the photograph carriers, which is far simpler in both construction and operation than any of the known apparatus.

It is another object of the present invention to provide a photogrammetric stereoscopic map plotting apparatus, particularly for evaluating an aerial photograph of the type comprising photoelectric follow-up elements functioning as control members between the plotted point and the photograph carriers, in which it is unnecessary to constantly effect readjusting operations and with which highly accurate measuring values can be obtained.

It is a further object of the present invention to provide a photogrammetric stereoscopic map plotting apparatus, particularly for evaluating an aerial photograph of the type comprising photoelectric follow-up elements functioning as control members between the plotted point and the photograph carriers, which has an angular range susceptible for evaluation.

These objects as well as further objects and advantages which will become apparent as the description proceeds are achieved by the apparatus of the present invention according to which the light rays controlling the follow-up movement consist of comparatively concentrated beams of light rays. According to the invention these beams are obtained by providing in the area of the plotted point a spot light source emitting light rays into the entire upper portion of the apparatus and by providing above the light source in the projection centers a first and a second aperture diaphragm. The diaphragm in the projection centers emits from the plurality of light rays a small beam only. This arrangement makes it unnecessary to provide collimators and the constant readjustment of the latter can be dispensed with. Furthermore, it is unnecessary to provide a mirror in the projection centers of the aerial photograph. According to a further feature of the invention the aerial photographs can therefore be adjusted by tilting the cross slide supporting the photographs and the reference marks about the center of the associated diaphragm.

The photoelectric elements associated with the aerial photographs or reference marks can be of such number that one photo cell is provided for each direction of movement. Preferably, however, the invention uses one photoelectric element only for each photograph or reference mark which element is divided into four segments whereof each pair of opposite segments co-operates to effect a displacement of the photograph and/or reference mark in one particular direction.

The invention is described in further detail with reference to the accompanying drawings, wherein:

FIGURE 1 is a sectional view of the apparatus of the present invention;

FIGURE 2 is a sectional view of part of the apparatus of the invention taken along lines II—II in FIGURE 1;

FIGURE 4 is a perspective view of a detail of the apparatus shown in FIGURE 1;

FIGURE 5 is a somewhat schematical plan view of photoelectric means used in the apparatus of the present invention.

Figure 3:
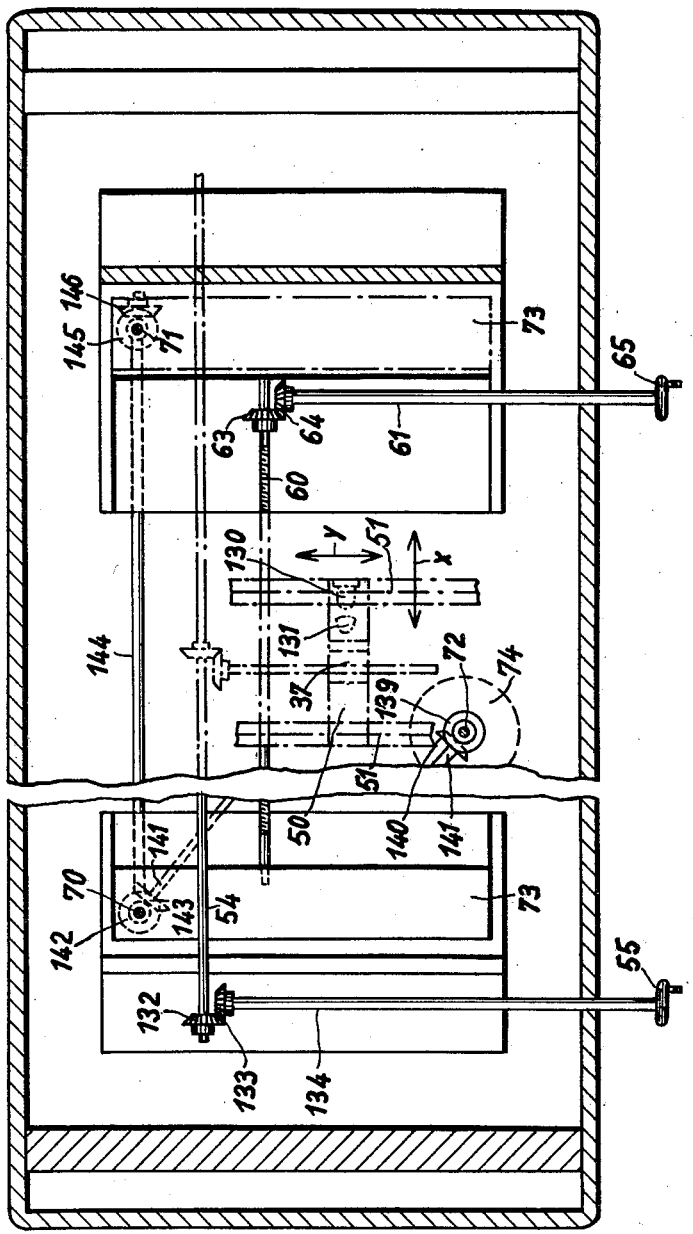
FIGURE 3 is a sectional view of another part of the apparatus of the present invention taken along lines III—III in FIGURE 1.

Referring now to the drawings more in detail, the apparatus of the present invention comprises the following structure: The aerial photograph 1 is mounted on a ring gear 26. A rod with a turn ring 112 is connected with gear ring 26, and the latter is positioned on ball bearings 24 supported by the upper portion of frame 128. Ring gear 26 is further connected with a spindle 25, operable by turn ring 112 via bevel gears 110 and 111. Partly surrounding the aerial photograph 1 there is provided a substantially U-shaped carriage 15 bearing a light source 27 and a condenser 28 above the photograph 1 and, below the latter, a prism 2 having semi-transparent specular surfaces, an objective 3, a reference mark 13 and a light source 14. Carriage 15 is supported by a guide member 17 and is connected with a spindle 16. Guide member 17 is supported, in turn, by a further guide member 21, and is connected with a spindle 19. A tubular support 17a is also connected with guide member 17 and houses mirrors 4 and 5. A hollow body 23 is pivotably connected with tubular support 17a and houses a mirror 6, rotatable about axis 22.

The guide member 21 has a boring 29 with which it is positioned on a spherical segment 30, the segment 30 is positioned in a fixed plate 31 connected with frame 128. Two spindles 32 and 33 having a spherical-shaped head portion project through the fixed plate 31 towards guide member 21. Spindle 33 has a shaft 118 with a bevel gear 120 meshing with bevel gear 121 on the shaft 119 of a turn knob 45. Spindle 32 has a shaft 114 with a bevel gear 116 meshing with bevel gear 117 on the shaft 115 of a turn knob 44 (see FIGURE 1).

An optical reversing prism 7 is provided in the path of rays leaving mirror 6, as well as a field lens 8, a mirror 9, mirror prisms 10 and 11, and a right-hand eye piece 12. The reversing prism 7 is mounted in a ring gear 34 meshing with a driving wheel 35, on a shaft 43, which is operable by turn button 40 on a shaft 41 and bevel gears 42 (see FIGURE 4).

A photoelectric element 36 is connected with carriage 15; it consists of two pairs of segments 100, 101, and 102, 103, as shown in FIGURE 5. Segments 100, 101 are connected with a motor 125 via lines 100a, 101a and relay R, the motor being in driving connection with spindle 16. Segments 102, 103 are connected with a motor 126 via lines 102a, 103a, and relay R, the motor being in driving connection with spindle 19.

The photoelectric element 36 is disposed above a hole diaphragm 38 provided in spherical segment 30. Below the afore-described structure means are provided for producing a light point 37a, consisting of a light source 130, a condenser lens 131, and a prism 37, on the upper surface of which the light point 37a is produced. Prism 37 rests on a carriage 50 which, in turn, is positioned on a guide member 51 connected with a spindle 52, the latter being connected with bevel gears 55, shaft 54, further bevel gears 132, 133, and a flexible shaft 134 bearing a hand-wheel 55, constituting means for displacing light point 37a in the x-direction. It will also be advantageous to extend shaft 54 and have it connected with a shaft 58 via key 57, of the carriage of a drawing pencil, not shown.

Means for displacing light point 37a in the y-direction consist of a spindle 60 driving guide member 51, the spindle being in driving connection with bevel gears 63, 64, a flexible shaft 61, and hand-wheel 65. Means for displacing light point 37a in z-direction (height adjustment) are shown in FIGURE 3 and comprise three spindles 70, 71, 72 mounted in a carrier 73 and connected with a foot pedal 74 via the bevel gear and shaft connections 139 through 146 (see FIGURE 3).

The afore-described structure is provided in duplicate, as shown in FIGURE 1, the corresponding elements on the left-hand side of the drawing bearing identical reference numerals, but having an apostrophe. The only difference between the two arrangements resides in the following: The base plate 31 associated with the right-hand aerial view 1 is provided with additional displacing means which are missing in the left-hand system for aerial view 11. These displacing means consist of a guide 46 for base plate 31, and a spindle 47 connected with turn button 48 via shaft 127.

The operation and cooperation of the afore-described structural arrangement will next be described in greater detail.

The aerial photograph 1 is illuminated by light source 27 via condenser 28. The light rays emanating from the photograph 1 are directed by prism 2 with the semi-transparent specular surfaces into objective 3 from where they pass via mirrors 4, 5 and 6 to the reversing prism 7 and then travel through view lens 8, mirror 9, mirror prisms 10 and 11, into eye piece 12 of the right-hand system of the evaluating apparatus, the left-hand system operating in an entirely analogous manner. The reference mark 13 is illuminated by the light source 14 and is reflected by the semi-transparent mirror layer of prism 2 into the plane of aerial photograph 1. The optical elements 2, 3, 13 and 14 on the carriage 15 can be displaced together with the carriage by means of the spindle 16 along guide member 17 in a first direction and also in a second direction since the guide member 21 is displaceable along guide member 21 in the direction of arrow 20 by means of spindle 19. The afore-described two different movements are also performed by the mirrors 4 and 5 since their tubular support 17a is attached to guide member 17. Mirror 6, however, does not participate in these movements although it can be rotated about axis 22 in order to direct the light rays into reversing prism 7 even after displacement of the optical elements 2, 3, 13 and 14. The hollow body 23 also rotates about axis 22 and effects the displacement of mirror 6 in a known manner.

It is not necessary for the aerial photograph 1 to participate in the two different movements of the optical elements in carriage 15; however, it can be rotatably adjusted by means of spindle 25, gear ring 26 and ball bearings 24, the spindle 25 being actuated by turning the turn button 112, the movement of which is transmitted by the bevel gears 110 and 111.

The guide member 21 can be adjusted so as to assume various inclined positions relative to the aerial photograph 1. This is done by turning the borings 44 and 45, thereby moving the spindles 32 and 33 via the shafts 114, 115 and 118, 119, respectively, and the bevel gears 116, 117, and 120, 121, respectively. Since the spindles 32 and 33 project with their spherical head portions through fixed plate 31, they finally come into contact with the lower surface of guide member 21 and pivot the same about the spherical segment 30. The tilting displacement of guide member 21 simultaneously moves the optical members 2, 3, 4 and 5 correspondingly. The turning of the image of the aerial view is compensated by the rotation of prism 7 about its optical axis and it is effected by turning boring 40, the movement of which is transmitted to gear ring 34 via shaft 41, bevel gears 42, shaft 43 and gear 35.

The photoelectric element 36, connected with carriage 15, receives light from light point 37 through the hole diaphragm 38 in spherical segment 30. The oppositely disposed segments of the photoelectric element cooperate, for example, in such a manner that the light-sensitive segments 100 and 101 control motor 125 via relay R and the light-sensitive segments 102 and 103 control motor 126 via the same relay R. Motor 125 drives spindle 16 and motor 126 drives spindle 19. If the light point 37 moves, the light spot 104 produced on the photoelectric element travels, as shown, for example, in FIGURE 5, towards segment 101. Consequently, segment 101 receives more light energy than segment 100, whereby an electric current is produced, driving motor 125 until a new balance is reached and the current production drops. This state is reached as soon as carriage 15 with the reference mark 13 and the image-producing optical elements as well as photoelectric element 36 have been displaced by a distance moving the light spot 104 to the position where both segments 100 and 101 receive an equal amount of light energy. A corresponding follow-up movement is effected by motor 126 as soon as the light spot 104 has moved from segment 102 towards segment 103.

The cooperation of the analogous structure associated with the left-hand aerial photograph 1' is entirely identical. However, the left-hand system does not have the means effecting a further displacement such as the guide member 46 and spindle 47 for moving base plate 31. These displacing means in the right-hand system are provided for making it possible to adjust the basis. By turning button 48 spindle 47 is revolved via shaft 127. Spindle 47 moves base plate 31 and thereby simultaneously mirror 6 as well as the aerial photograph 1, since the latter is connected with the base plate 31 by frame 128 (see FIGURE 2).

The light point 37a, producing elements 37, 130 and 131 is common to both the left-hand and the right-hand stereoscopic system, with two equal beams of light being emitted towards the upper portion of the apparatus, one beam travelling through diaphragm 38 of the right-hand system and the other beam travelling through diaphragm 38' of the left-hand system.

The light point 37a can be displaced by the arrows x, y and z (for x and z see FIGURE 1, for y see FIGURE 3). The displacement in direction x is effected by operating hand-wheel 55 and thereby turning the spindle via flexible shaft 134, bevel gears 133 and 132, shaft 54 and bevel gears 53, thereby displacing carriage 50 along guide member 51. The operation of hand-wheel 55 simultaneously moves in a known manner a drawing pencil in direction x via the extension of shaft 54, key 57 and shaft 58.

The displacement of light point 37a in direction y is effected by turning hand-wheel 65, thereby moving the spindle 60 via shaft 61 and bevel gears 64 and 63, spindle 60 displacing guide member 51. Again, the operation of hand-wheel 65 can be used for simultaneously moving, in direction y, a drawing pencil via key 66, also in a known manner.

The movement in the third dimension, i.e. direction z, for example the height adjustment of light point 37, is carried out by means of the three spindles 70, 71, 72, the spindles being operated by foot pedal 74 via shafts and bevel gears 139 through 146.

The use of the apparatus of the present invention by the operating person is extremely simple. For evaluating the aerial photograph 1 and 1' the operating person simply has to incline the guide members 21 and 21' by turning the buttons 44 and 45. Thereafter, the hand-wheels 65 and 55 are turned and foot pedal 74 is operated so as to move light point 37a in the dimensions x, y and z. Due to this three-dimensional displacement the respective direction of the light beams emitted from point 37a and falling through diaphragms 38 and 38' are changed and the points of their impingement on the photoelectric elements are correspondingly varied. This will put into operation the follow-up control means and displace the reference marks 13 and 13', varying the displacement of the light point. Simultaneously therewith, the optical elements 2, 3, 13 and 14 are moved. As a result, the landscape passes before the eye of the viewer looking through eye pieces 12 and 12'.

The respective amounts of displacement of the light point 37a can be recorded by known means and in a known manner as described, for example, in Schwidefsky, "Grundriss der Photogrammetrie," Stuttgart, 1954, pages 86, 178, 187, or U.S. Patent 3,088,209 (application S.N. 844,983, October 7, 1959, same assignor).

It will be understood that this invention is susceptible to modification in order to adapt it to different usages and conditions and, accordingly, it is desired to comprehend such modifications within this invention as may fall within the scope of the appended claims.

What we claim is:

1. A photogrammetric stereoscopic map plotting device comprising a stereoscopic optical system having two ray paths, two aerial photographs and two reference marks; one control system for each ray path, each of said control systems having two carriages, said carriages carrying said reference marks; driving spindles, said driving spindles being operatively connected with said carriages for adjusting said carriages in two directions perpendicular to each other in one plane; two diaphragms, said diaphragms being arranged in the projection centers of the map plotting device; a spotlight source, said spotlight source being arranged on a spatially adjustable carriage below said diaphragms; photoelectric elements rigidly connected with said carriages carrying said reference marks and arranged above said diaphragms; two relays and four servo-motors connected with said photoelectric elements and the driving spindles of said carriages carrying said reference marks.

2. A photogrammetric stereoscopic map plotting device as described in claim 1, said photoelectric elements comprising a first and a second photoelectric cell, each divided into four sections and associated with one of said diaphragms, respectively.

3. A photogrammetric stereoscopic map plotting device as described in claim 1, further comprising means for pivoting said aerial photographs about the respective centers of said diaphragms.

4. A photogrammetric stereoscopic map plotting device comprising a stereoscopic optical system having two aerial photographs, two stationary reference marks and means defining two ray paths each including one photograph and one reference mark; one control system for each ray path, each of said control systems having two displaceable carriages, said carriages displacing the relative position of ray path, photograph and mark; driving spindles, said driving spindles being operatively connected with said carriages for adjusting said carriages in two directions perpendicular to each other in one plane; two diaphragms, said diaphragms being arranged in the projection centers of the map plotting device; a spotlight source, said spotlight source being arranged on a spatially adjustable carriage mechanism below said diaphragm; photoelectric elements rigidly connected with said carriages of said control system and arranged above said diaphragms; two relays and four servo-motors connected with said photoelectric elements and the driving spindles of said carriages of said control systems.

5. In a stereo-photogrammetric map plotting apparatus having two stereo pictures, the combination comprising, two optical projection and observing units, respectively for said pictures, each unit comprising, a picture supporting means, optical means for projecting a visible marker into the ray path of the picture of the unit, carriage means supporting one of said mark projecting means and said picture supporting means, and means for laterally and individually displacing said carriage means in two perpendicular directions; photoelectric receiver means for each carriage means of said two units, being laterally displaceable therewith; means for forming two light beams of common origin and for directing them towards said two receiver means, respectively; follow-up control means linking and connecting each carriage means with its photoelectric receiver means so that each beam is always centered with respect to its intersecting receiver means; means for moving said common origin in three directions including two different lateral directions and a third direction being perpendicular to said two lateral directions; and means for additionally moving said two carriage means in the direction of projection.

6. In a stereo-photogrammetric map plotting apparatus having two stereo pictures, the combination comprising, an optical image forming unit including ray path defining means for each picture; picture supporting means for each picture; two optical systems for forming visible markers and respectively projecting each into said image ray paths; individual driving means for laterally and individually displacing each said picture supporting means and each said projected mark relative to each other; two photoelectric receiver means each linked for following said lateral displacements; light source means, means for mounting said source means displaceably in three different directions relative to said photoelectric means; two adjustable diaphragm means being stationary during evaluation of one pair of pictures and being respectively associated with each unit and each forming an individual light beam originating from said source means; and follow-up control means interconnecting said driving means and said photoelectric means for actuating said driving means so that each photoelectric means returns to intersect the beam formed by the associated diaphragm means.

References Cited in the file of this patent
UNITED STATES PATENTS

| | | |
|---|---|---|
| 2,489,305 | McLennan | Nov. 29, 1959 |
| 2,964,644 | Hobrough | Dec. 13, 1960 |
| 3,004,464 | Leighton et al. | Oct. 17, 1961 |